US006435494B2

(12) United States Patent
Takahashi et al.

(10) Patent No.: US 6,435,494 B2
(45) Date of Patent: Aug. 20, 2002

(54) CLAMP APPARATUS

(75) Inventors: Hidehito Takahashi, Matsudo; Kazuyoshi Takahashi, Tokyo, both of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/725,075

(22) Filed: Nov. 29, 2000

(30) Foreign Application Priority Data

Dec. 8, 1999 (JP) .......................................... 11-348666

(51) Int. Cl.[7] ................................................ B23Q 3/03
(52) U.S. Cl. ....................................................... 269/32
(58) Field of Search .......................... 92/23–25; 269/32, 269/27, 24, 239, 228, 91, 93, 94

(56) References Cited

U.S. PATENT DOCUMENTS 4,214,795 A * 7/1980 Kakuminato .................. 91/25
4,458,889 A 7/1984 McPherson et al. .......... 269/32
5,293,812 A 3/1994 Maki et al.

FOREIGN PATENT DOCUMENTS

| | | |
|---|---|---|
| DE | DE 34 03 961 | 8/1985 |
| DE | DE 41 92 710 | 5/1992 |

* cited by examiner

*Primary Examiner*—Robert C. Watson
(74) *Attorney, Agent, or Firm*—Paul A. Guss

(57) ABSTRACT

Disclosed is a clamp apparatus comprising a cylinder section for displacing a rod member provided at the inside of a body in an axial direction; a toggle link mechanism for converting rectilinear motion of the rod member into rotary motion; an arm for making rotation by a predetermined angle in accordance with a driving action of the cylinder section; and a lock mechanism for maintaining a clamped state of a workpiece effected by the arm even when transmission of driving force of the cylinder section to the arm is stopped.

9 Claims, 10 Drawing Sheets

CLAMP APPARATUS

BACKGROUND OF THE INVENTION

1. Field of the Invention

The present invention relates to a clamp apparatus capable of clamping a workpiece by the aid of an arm which is rotatable by a predetermined angle in accordance with a driving action of a driving mechanism.

2. Description of the Related Art

A clamp cylinder has been hitherto used, for example, in order to clamp a constitutive part when the constitutive part of an automobile or the like is welded. Such a clamp cylinder is disclosed, for example, in U.S. Pat. No. 4,458,889.

The clamp cylinder disclosed in U.S. Pat. No. 4,458,889 is constructed as shown in FIGS. 9 and 10. That is, a piston rod 2, which is movable back and forth in accordance with the driving action of a cylinder 1*c*, is arranged between a pair divided bodies 1*a*, 1*b*. A coupling 3 is connected to a first end of the piston rod 2. A pair of links 5*a*, 5*b* and a pair of rollers 6*a*, 6*b* are rotatably attached to both side portions of the coupling 3 by the aid of a first shaft 4. An arm 8 is connected rotatably by a predetermined angle between the pair of links 5*a*, 5*b* by the aid of a second shaft 7.

In this arrangement, the pair of rollers 6*a*, 6*b* are provided slidably by the aid of a plurality of needles 9*a* which are installed to holes. The piston rod 2 is provided so that it is displaceable integrally with the rollers 6*a*, 6*b* in accordance with the guiding action of the rollers 6*a*, 6*b* which are slidable along track grooves 9*b* formed on the bodies 1*a*, 1*b* respectively.

However, the clamp cylinder disclosed in U.S. Pat. No. 4,458,889 concerning the conventional technique described above is not provided with a mechanism for holding the clamped state of a workpiece, for example, if the pressure fluid to be supplied to the cylinder 1*c* is stopped by any cause when the unillustrated workpiece is clamped by the arm 8. Therefore, it is feared that the clamped state of the workpiece may be canceled, and the workpiece may be disengaged.

SUMMARY OF THE INVENTION

A general object of the present invention is to provide a clamp apparatus which is capable of reliably maintaining the clamped state of a workpiece even when the supply of driving force to an arm is stopped.

A principal object of the present invention is to provide a clamp apparatus which makes it possible to avoid any excessive consumption of a pressure fluid so that the flow rate of the pressure fluid to be used may be reduced by commonly using the pressure fluid to be supplied into a pressure chamber and the pressure fluid to be supplied to a cylinder chamber.

Another object of the present invention is to provide a clamp apparatus which makes it possible to reliably cancel the locked state before a piston is displaced.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is canceled;

DESCRIPTION OF THE PREFERRED EMBODIMENTS

Figure 1:
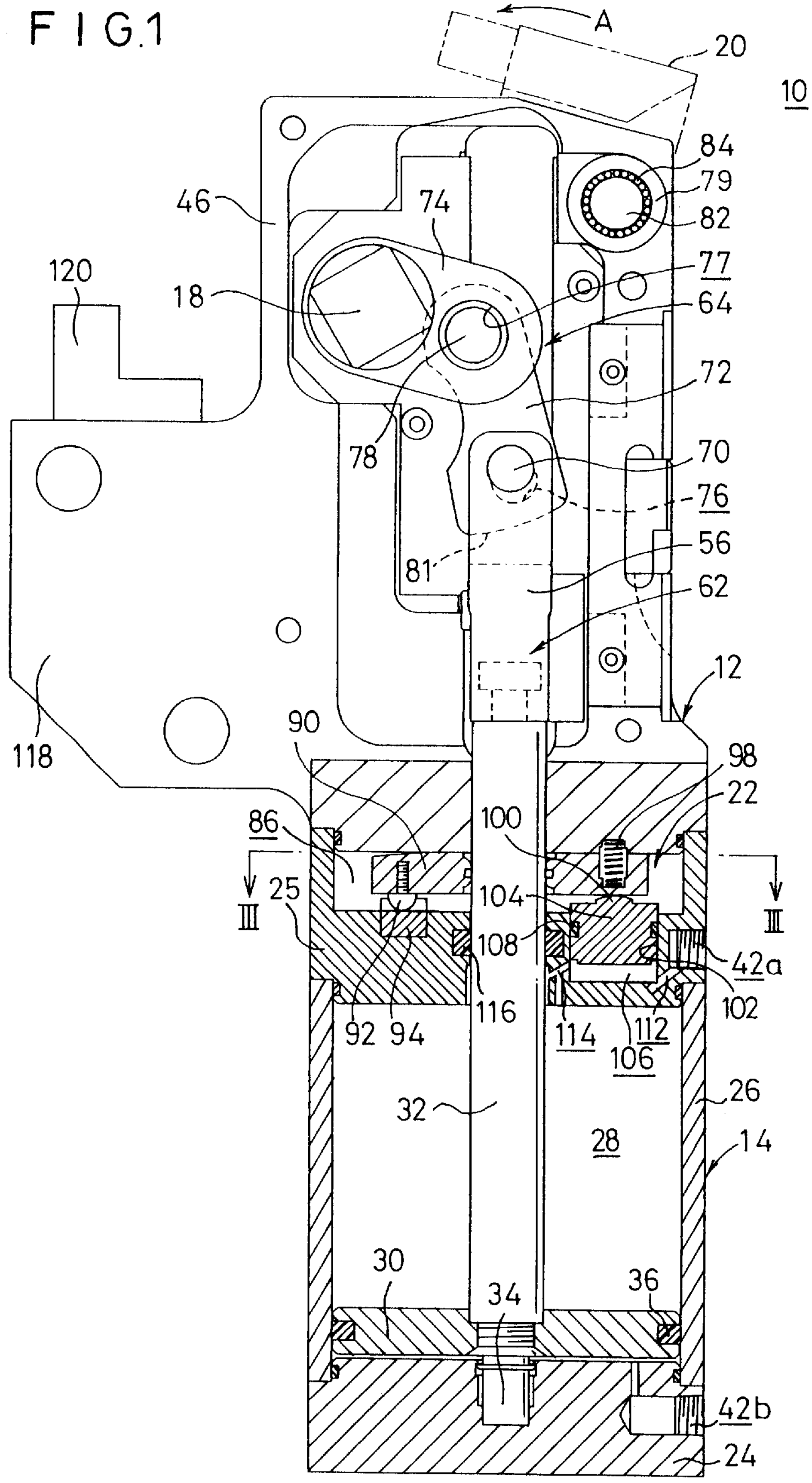
FIG. 1 shows a vertical sectional view taken in an axial direction illustrating a clamp apparatus according to an embodiment of the present invention.

A clamp apparatus 10 according to an embodiment of the present invention is shown in FIG. 1. The clamp apparatus 10 comprises a body 12, a cylinder section (driving mechanism) 14 which is connected in an air-tight manner to a lower end of the body 12, an arm 20 which is connected to a bearing section 18 having a rectangular cross section protruding to the outside through a pair of substantially circular openings (not shown) formed through the body 12, and a lock mechanism 22 which maintains a state in which an unillustrated workpiece is clamped by the arm 20.

The cylinder section 14 comprises an end block 24 and a cylindrical member having a substantially elliptic cross section, and it includes a cylinder tube 26 with its first end which is connected in an air-tight manner to a recess of the end block 24 and with its second end which is connected in an air-tight manner to a block member 25 for constructing the lock mechanism 22.

Figure 3:
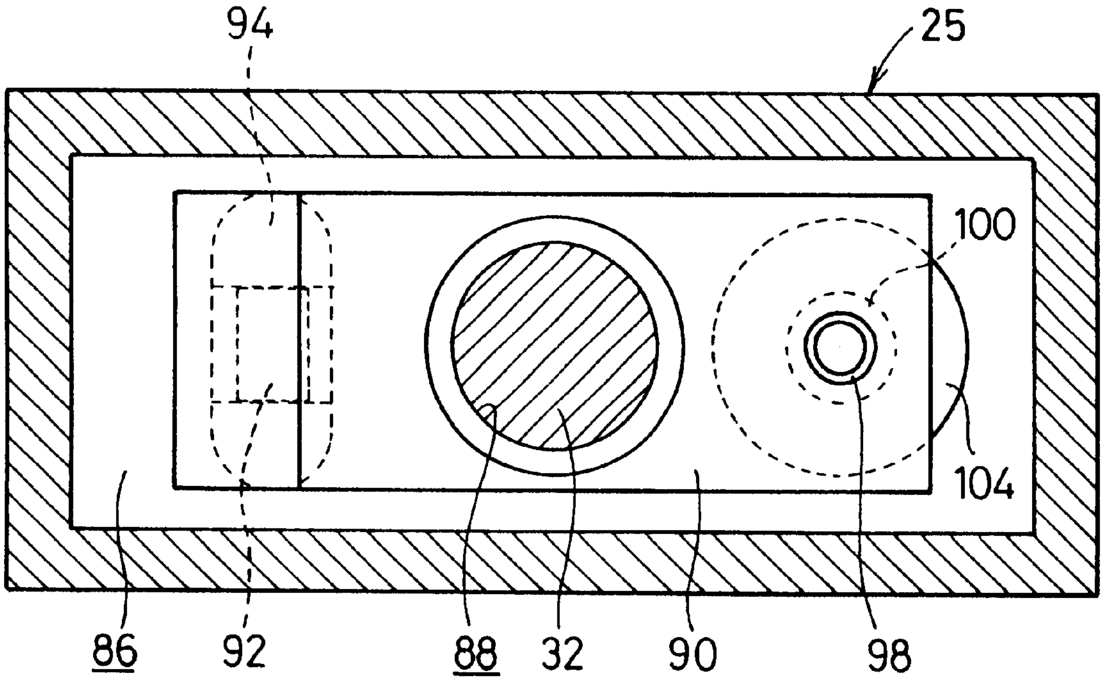
FIG. 3 shows a lateral sectional view of the arrangement taken along a line III—III shown in FIG. 1.

The cylinder section 14 further comprises a piston 30 which is accommodated in the cylinder tube 26 and which makes reciprocating movement along a cylinder chamber 28, and a rod member 32 which is connected to a central portion of the piston 30 and which is displaceable integrally with the piston 30. As shown in FIG. 3, the rod member 32 is formed such that the cross-sectional configuration, which is taken in a direction substantially perpendicular to the axis, is substantially circular. A damper member 34 for making abutment against the piston 30 to absorb the shock is installed at a central portion of the end block 24. A piston packing 36 is installed to the outer circumferential surface of the piston 30.

Unillustrated attachment holes are bored through four corners of the end block 24. The end block 24, the cylinder tube 26, and the block member 25 are assembled in an air-tight manner respectively by the aid of four shafts (not shown) inserted through the attachment holes. A pair of pressure fluid inlet/outlet ports 42*a*, 42*b* for introducing/discharging the pressure fluid (for example, compressed air) with respect to the cylinder chamber 28 are formed for the block member 25 and the end block 24 respectively.

The body 12 is constructed by integrally assembling a first casing 46 and an unillustrated second casing. A chamber is formed in the body 12 by recesses formed for the first casing 46 and the second casing respectively. The rod member 32 is provided so that its free end faces the inside of the chamber.

A toggle link mechanism 64 for converting the rectilinear motion of the rod member 32 into the rotary motion of the arm 20 by the aid of a knuckle joint 62 is provided at the first end of the rod member 32. The knuckle joint 62 comprises a knuckle block 56 having a forked section with branches which are separated from each other by a predetermined spacing distance and which are branched substantially in parallel to one another, and a knuckle pin 70 which is rotatably attached to holes formed through the forked section.

The toggle link mechanism 64 has a link plate (link member) 72 which is connected between the branches of the forked section of the knuckle joint 62 by the aid of the knuckle pin 70, and a support lever 74 which is rotatably supported by the pair of substantially circular openings formed through the first casing 46 and the second casing respectively.

The link plate 72 is interposed between the knuckle joint 62 and the support lever 74, and it functions to link the knuckle joint 62 and the support lever 74. That is, the link plate 72 has a long hole 76 which is formed on the first end side, and a hole 77 which is formed on the second end side. The link plate 72 is connected to the free end of the rod member 32 by the aid of the knuckle joint 62 and the knuckle pin 70 engaged with the long hole 76, and it is connected to the forked section of the support lever 74 by the aid of a link pin 78 rotatably attached to the hole 77. A curved surface 81 for making contact with the guide roller 79 as described later on is formed at a first end of the link plate 72.

The support lever 74 has a forked section which is formed with a hole for rotatably attaching the link pin 78, and the bearing section 18 having a rectangular cross section which is formed to protrude in the direction substantially perpendicular to the axis of the rod member 32 and which is exposed to the outside from the body 12 through an unillustrated opening. The arm 20 for clamping the unillustrated workpiece is detachably installed to the bearing section 18. Therefore, the support lever 74 is provided to make rotary action integrally with the arm 20.

Recesses each having a circular arc-shaped cross section are formed at upper portions of inner wall surfaces of the first casing 46 and the second casing for constructing the body 12 respectively. The guide roller 79, which is rotatable by a predetermined angle by making contact with the curved surface 81 of the link plate 72, is provided in the recesses. A pin member 82 for rotatably supporting the guide roller 79 is secured to holes formed on the first casing 46 and the second casing. A plurality of needle bearings 84 are installed in the circumferential direction to a through-hole of the guide roller 79. The guide roller 79 is provided to smoothly make rolling movement in accordance with the rolling action of the needle bearings 84.

Figure 2:
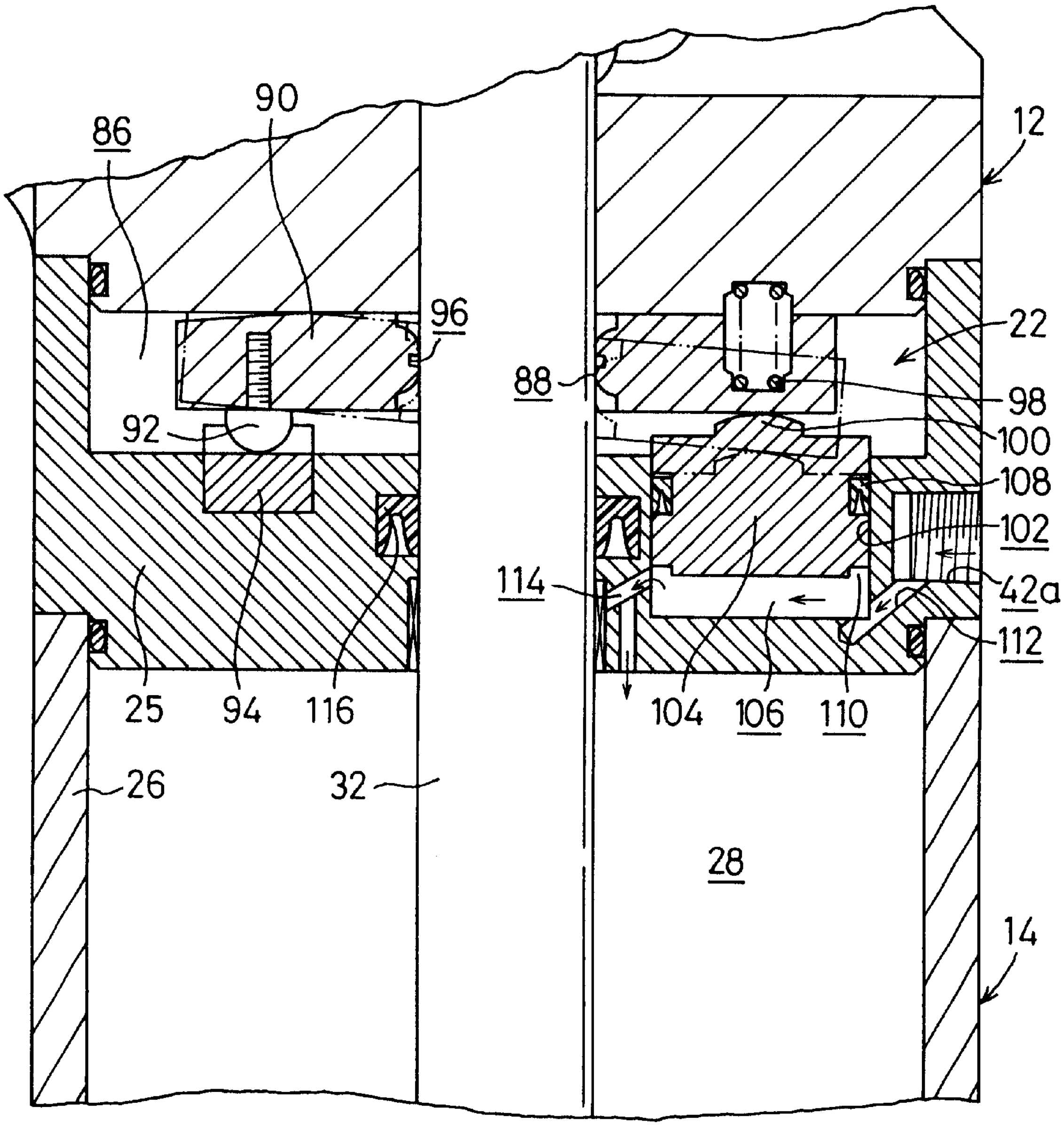
FIG. 2 shows, with partial omission, a magnified vertical sectional view illustrating a lock mechanism which constitutes the clamp apparatus.

As shown in FIG. 2, the lock mechanism 22 includes the block member 25 which is connected to the first end of the body 12 to form a closed chamber 86, a lock plate 90 which is arranged in the chamber 86 and which is to be externally fitted to the rod member 32 by the aid of a hole 88 having a circular cross section formed to be slightly larger than a cross-sectional configuration of the rod member 32 (see FIG. 3), a support point pin 92 which supports the lock plate 90 at its first end, and a holding member 94 which is secured to a recess of the block member 25 for holding the support point pin 92. The inner circumferential surface of the hole 88 of the lock plate 90 is formed to have a circular arc-shaped vertical cross section. An annular groove 96, which functions as a relief groove for lubricating oil applied to the outer surface of the rod member 32 is formed at the inner circumferential surface of the hole 88 (see FIG. 2).

The lock mechanism 22 is further provided with a spring member 98 which is interposed between the block member 25 and the lock plate 90, for pressing the lock plate 90 toward the block member 25, a release piston 104 which has, at its upper surface portion, a projection 100 for making abutment against the lock plate 90 and which is displaceable along a recess 102 of the block member 25, and a pressure chamber 106 which is closed by the release piston 104 and to which the pressure fluid is supplied from the first pressure fluid inlet/outlet port **42*a***.

When the lock plate 90 is inclined by a predetermined angle slanting downward to the right about the support point of the support point pin 92, then the rod member 32 and the hole 88 are engaged with each other to enhance the nipping action, and thus a locked state is given in which the rod member 32 is prevented from the downward displacement (see two-dot chain lines in FIG. 2). When the lock plate 90 is in a substantially horizontal state against the resilient force of the spring member 98 in accordance with the pressing action of the release piston 104, then the rod member 32 freely makes the downward displacement, and thus an unlocked state is given (see solid lines in FIG. 2). A piston packing 108 is installed to an annular groove of the release piston 104. An annular cutout 110, which is cut out in the circumferential direction, is formed at a bottom surface portion of the release piston 104.

A first passage 112, which makes communication between the first pressure fluid inlet/outlet port **42*a* and the pressure chamber 106, is formed. The first passage 112 is formed to be inclined by a predetermined angle slanting downward to the left. Accordingly, even in the case of a state in which the release piston 104 is seated in the recess 102, the pressure fluid can be supplied to the annular cutout 110 to press the release piston 104** upwardly.

Figure 4:
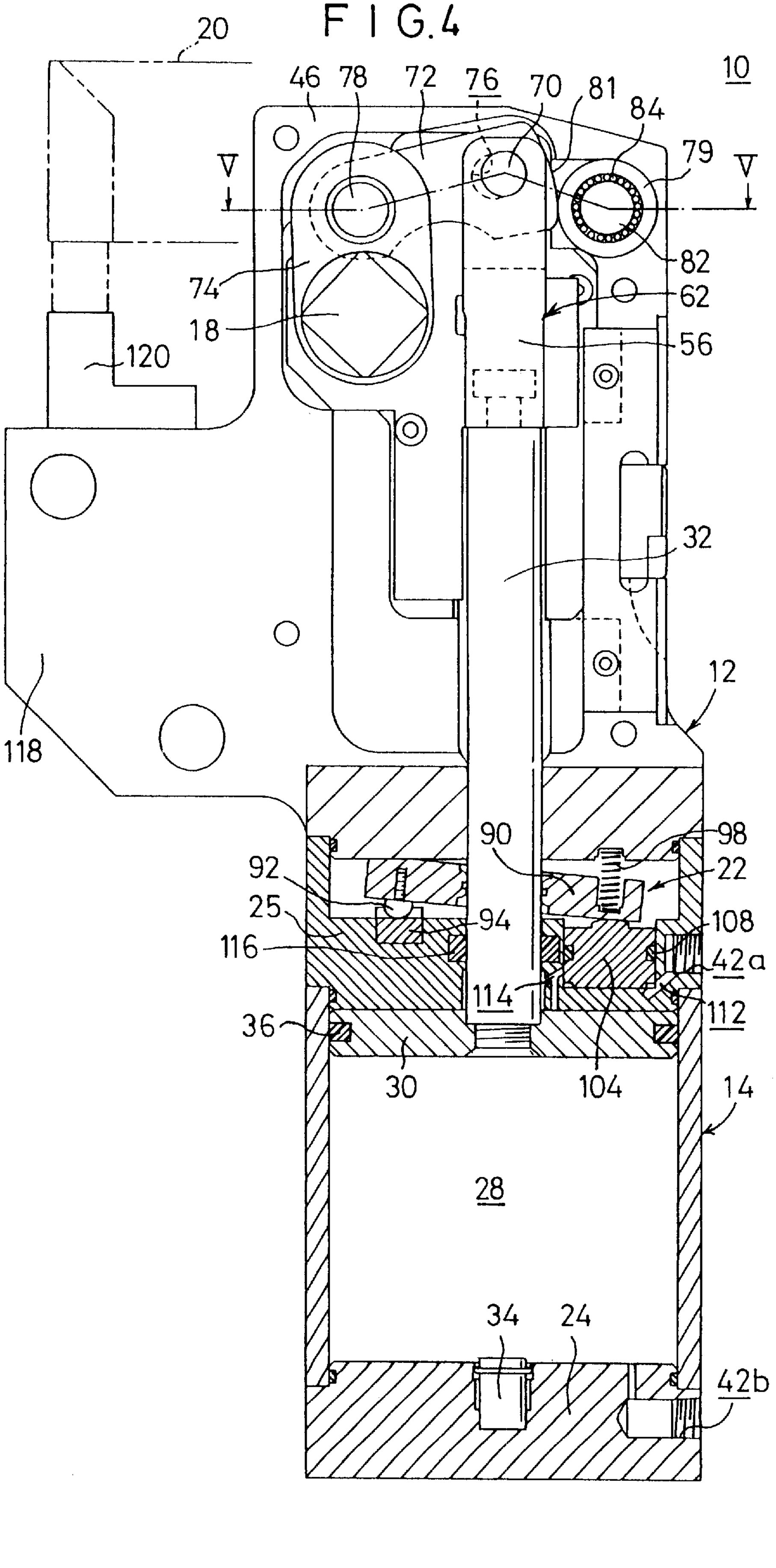
FIG. 4 illustrates the operation depicting a state in which an arm is rotated from the initial state shown in FIG. 1, and a workpiece is clamped.
Figure 5:
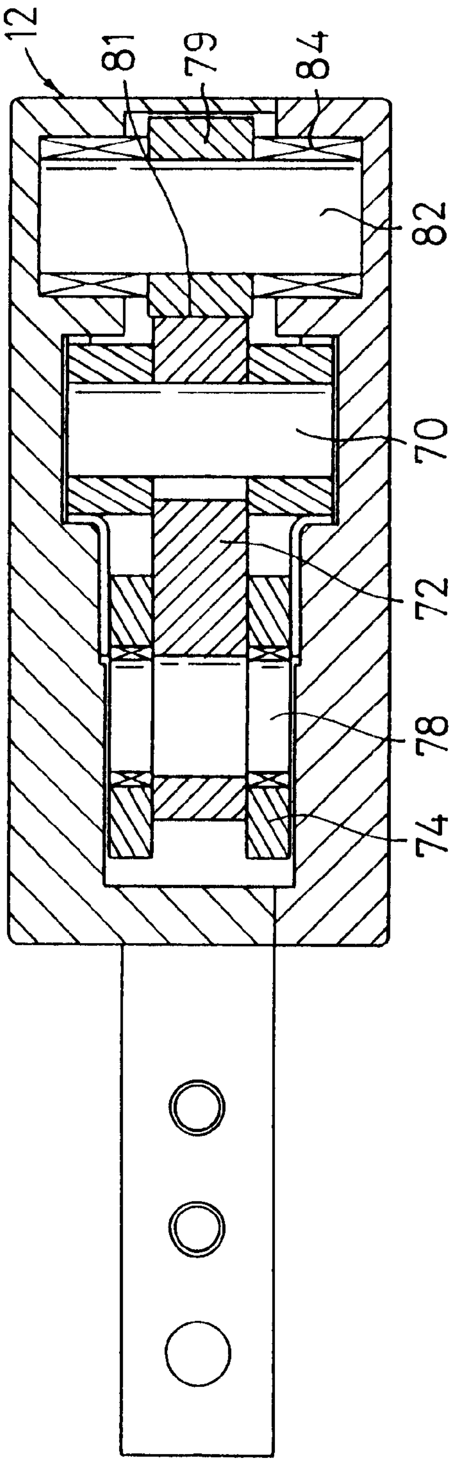
FIG. 5 shows a lateral sectional view taken along a line V—V shown in FIG. 4.

Further, a second passage 114, which makes communication between the pressure chamber 106 and the upper cylinder chamber 28 (rod-side cylinder chamber), is formed. The second passage 114 is formed to be inclined by a predetermined angle slanting downward to the left. As shown in FIG. 4, when the release piston 104 is seated in the recess 102, the second passage 114 is closed by the outer circumferential surface of the release piston 104 to intercept the communication between the pressure chamber 106 and the upper cylinder chamber 28. Accordingly, the pressure fluid, which is introduced into the pressure chamber 106, is prevented from the supply to the upper cylinder chamber 28. On the other hand, as shown in FIGS. 1 and 2, when the release piston 104 is moved upwardly, the pressure chamber 106 is communicated with the upper cylinder chamber 28 via the second passage 114. Accordingly, the pressure fluid, which is introduced into the pressure chamber 106, is supplied to the upper cylinder chamber 28.

A rod packing 116 for surrounding the outer circumferential surface of the rod member 32 is installed to the block member 25. As shown in FIG. 1, a stopper 120 for regulating the rotation of the arm 20 is connected to a flange 118 of the body 12.

The clamp apparatus 10 according to the embodiment of the present invention is basically constructed as described above. Next, its operation, function, and effect will be explained.

At first, the clamp apparatus 10 is fixed at a predetermined position by means of an unillustrated fixing means. First ends of pipes such as unillustrated tubes are connected to the pair of pressure fluid inlet/outlet ports 42*a*, 42*b* respectively. Second ends of the pipes are connected to an unillustrated pressure fluid supply source.

FIG. 1 shows the unclamped state, and FIG. 4 shows the clamped state respectively. The following explanation will be made assuming that the unclamped state shown in FIG. 1 resides in the initial position. At the initial position described above, it is assumed that the pressure fluid is supplied to the pressure chamber 106 via the first pressure fluid inlet/outlet port 42*a*, and the release piston 104 is moved upwardly to give a state in which the lock plate 90 is in the substantially horizontal state in which the rod member 32 is displaceably unlocked.

After performing the preparatory operation as described above, the operation is performed starting from the initial position shown in FIG. 1. That is, the unillustrated pressure fluid supply source is energized to introduce the pressure fluid (for example, compressed air) from the second pressure fluid inlet/outlet port 42*b* to the lower cylinder chamber 28 disposed under the piston 30. The piston 30 is pressed in accordance with the action of the pressure fluid introduced into the cylinder chamber 28. The piston 30 is moved upwardly along the cylinder chamber 28.

The rectilinear motion of the piston 30 is transmitted to the toggle link mechanism 64 via the rod member 32 and the knuckle joint 62. The rectilinear motion is converted into the rotary motion of the arm 20 in accordance with the rotary action of the support lever 74 which constitutes the toggle link mechanism 64.

That is, the force, which upwardly presses the link plate 72 and the knuckle joint 62 engaged with the free end of the rod member 32, makes the action in accordance with the rectilinear motion (upward movement) of the piston 30. Owing to the pressing force exerted on the link plate 72, the link plate 72 is rotated by a predetermined angle about the support point of the knuckle pin 70, and the support lever 74 is rotated in accordance with the linking action of the link plate 72.

Therefore, the arm 20 is rotated by a predetermined angle in the direction of the arrow A about the support point of the bearing section 18 of the support lever 74.

During the process in which the arm 20 is rotated in the direction of the arrow A as described above, the curved surface 81 of the link plate 72 contacts with the guide roller 79. The guide roller 79 is rotated about the center of the pin member 82 while maintaining the state of contact with the curved surface 81.

The arm 20 is further rotated, and it abuts against the workpiece. Accordingly, the rotary action of the arm 20 is stopped. As a result, the clamped state is achieved, in which the workpiece is clamped by the arm 20.

After the rotary action of the arm 20 is stopped to give the clamped state, the piston 30 and the rod member 32 are further moved upwardly only slightly. Then, the piston 30 and the rod member 32 are stopped at the displacement terminal end position (see FIG. 4).

When the workpiece is in the clamped state, the first pressure fluid inlet/outlet port 42*a* is open to the atmospheric air in accordance with the switching action of an unillustrated directional control valve. Accordingly, the pressure fluid, which has been supplied to the pressure chamber 106, is discharged to the atmospheric air. The release piston 104 is moved downwardly along the recess 102 in accordance with the resilient force of the spring member 98. Therefore, when the release piston 104 is moved downwardly, the lock plate 90 is in the state of being inclined by the predetermined angle about the support point of the support point pin 92. In this situation, the nipping action is caused between the hole 88 of the lock plate 90 and the outer circumferential surface of the rod member 32 to give the locked state in which the downward movement of the rod member 32 is prohibited.

In the locked state described above, for example, when the second pressure fluid inlet/outlet port 42*b* is in a state of being open to the atmospheric air, even if the supply of the pressure fluid is stopped due to any cause in the state in which the workpiece is clamped, then the clamped state is not canceled, which is reliably maintained by the lock mechanism 22.

As described above, in the embodiment of the present invention, owing to the provision of the lock mechanism 22, even if the supply of the pressure fluid to the cylinder section 14 to function as the driving mechanism is stopped, it is possible to reliably maintain the clamped state of the workpiece.

Next, explanation will be made for the process for releasing the locked state.

The nipping state between the outer circumferential surface of the rod member 32 and the hole 88 is canceled by slightly moving the rod member 32 upwardly by supplying the pressure fluid to the lower cylinder chamber 28 via the second pressure fluid inlet/outlet port 42*b* in the locked state. Subsequently, the supply of the pressure fluid is switched from the second pressure fluid inlet/outlet port 42*b* to the first pressure fluid inlet/outlet port 42*a* in accordance with the switching action of the unillustrated directional control valve.

The pressure fluid, which is supplied to the first pressure fluid inlet/outlet port 42*a*, is introduced into the pressure chamber 106 via the first passage 112. The annular cutout 110 of the release piston 104 is pressed thereby, and thus the release piston 104 is displaced upwardly. In this situation, the second passage 114, which communicates with the upper cylinder chamber 28, is closed by the side wall of the release piston 104. Therefore, the pressure fluid is not supplied to the upper cylinder chamber 28. The rod member 32 is prevented from any downward displacement.

When the release piston 104 is moved upwardly in accordance with the action of the pressure fluid supplied into the pressure chamber 106, the lock plate 90 is pressed upwardly. Accordingly, the lock plate 90 is displaced from the state of being inclined slanting downward to the right to the substantially horizontal state by using the support point of the support point pin 92, and thus the locked state is canceled. That is, the lock plate 90 is released from the locked state in which the lock plate 90 is inclined slanting downward to the right to prevent the rod member 32 from the displacement in accordance with the engaging action thereof. Thus, the rod member 32 is in the state in which it is possible to freely make the downward movement.

When the release piston 104 is moved upwardly to cancel the locked state, the second passage 114, which communicates with the upper cylinder chamber 28, is opened. The pressure fluid, which is supplied to the pressure chamber 106, is introduced into the upper cylinder chamber 28 via the second passage 114 to press the piston 30 downwardly.

As described above, in the embodiment of the present invention, there is provided the second passage 114 for making communication between the pressure chamber 106 and the upper cylinder chamber 28. After the release piston

104 is moved upwardly to cancel the locked state, the pressure fluid is introduced into the upper cylinder chamber 28 via the second passage 114.

Therefore, it is unnecessary to provide any additional port for supplying the pressure fluid to the release piston 104. Further, the pressure chamber can be supplied to the upper cylinder chamber 28 after the release piston 104 is moved upwardly to cancel the locked state. Therefore, it is unnecessary to provide any mechanism for adjusting the timing to displace the release piston 104 and the piston 30. It is possible to use the simple structure for the entire clamp apparatus 10.

Further, the pressure fluid to be supplied to the inside of the pressure chamber 106 and the pressure fluid to be supplied to the upper cylinder chamber 28 can be commonly used. Therefore, it is possible to avoid any excessive consumption of the pressure fluid, and it is possible to reduce the flow rate of the pressure fluid to be used.

In this case, the piston 30 is moved downwardly by supplying the pressure fluid to the upper cylinder chamber 28. When the support lever 74 is rotated in a direction opposite to the above by the aid of the link plate 72 in accordance with the downward movement action of the rod member 32, then the arm 20 is rotated in a direction to make separation from the workpiece, and thus the initial position shown in FIG. 1 is restored.

The embodiment of the present invention has been explained such that the lock mechanism 22 is operated when the workpiece is clamped. However, it is a matter of course that the pressure fluid in the pressure chamber 106 may be discharged to the atmospheric air in accordance with the switching action of the unillustrated directional control valve to move the release piston 104 downwardly, for example, when the workpiece is in the unclamped state as at the initial position or the like so that the lock plate 90 may be tilted to give the locked state.

Figure 6:
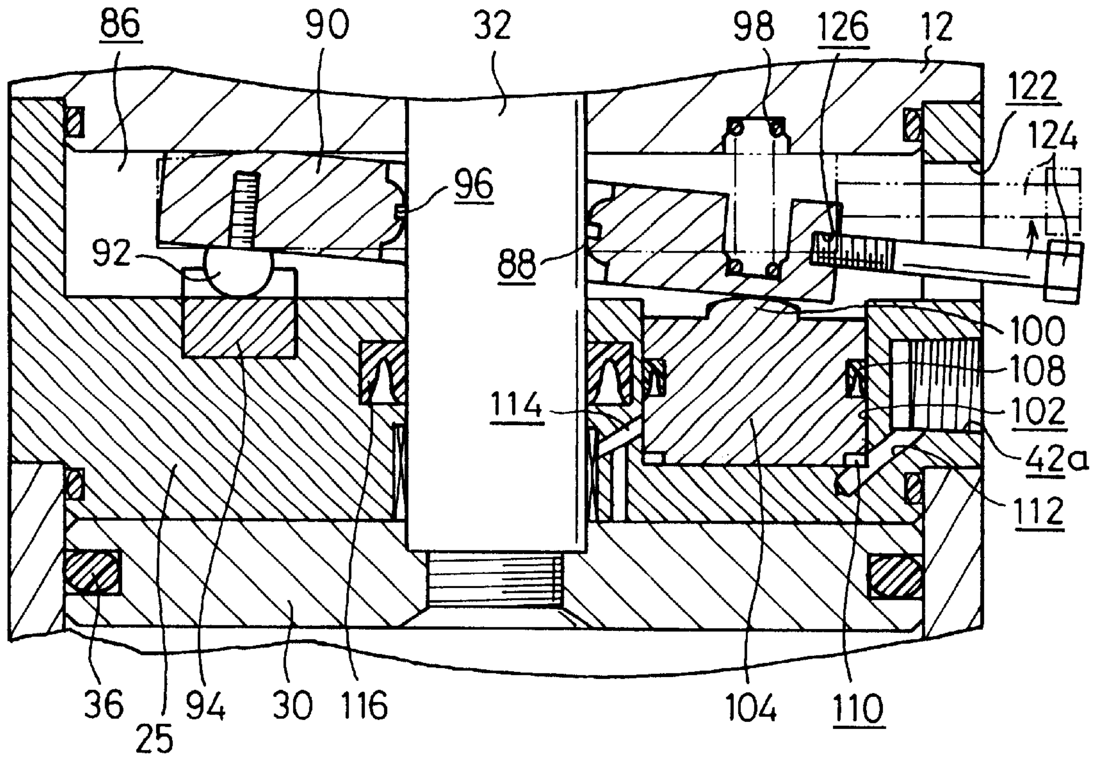
FIG. 6 illustrates the operation to manually cancel the locked state by means of a bolt inserted through a manual operation hole.

Further, as shown in FIG. 6, the following arrangement is also preferred. That is, a manual operation hole 122 is bored through the block member 25. A bolt 124 is screwed through the manual operation hole 122 into a screw hole 126 formed at a side portion of the lock plate 90. The locked state may be canceled by manually operating the bolt 124.

Figure 7:
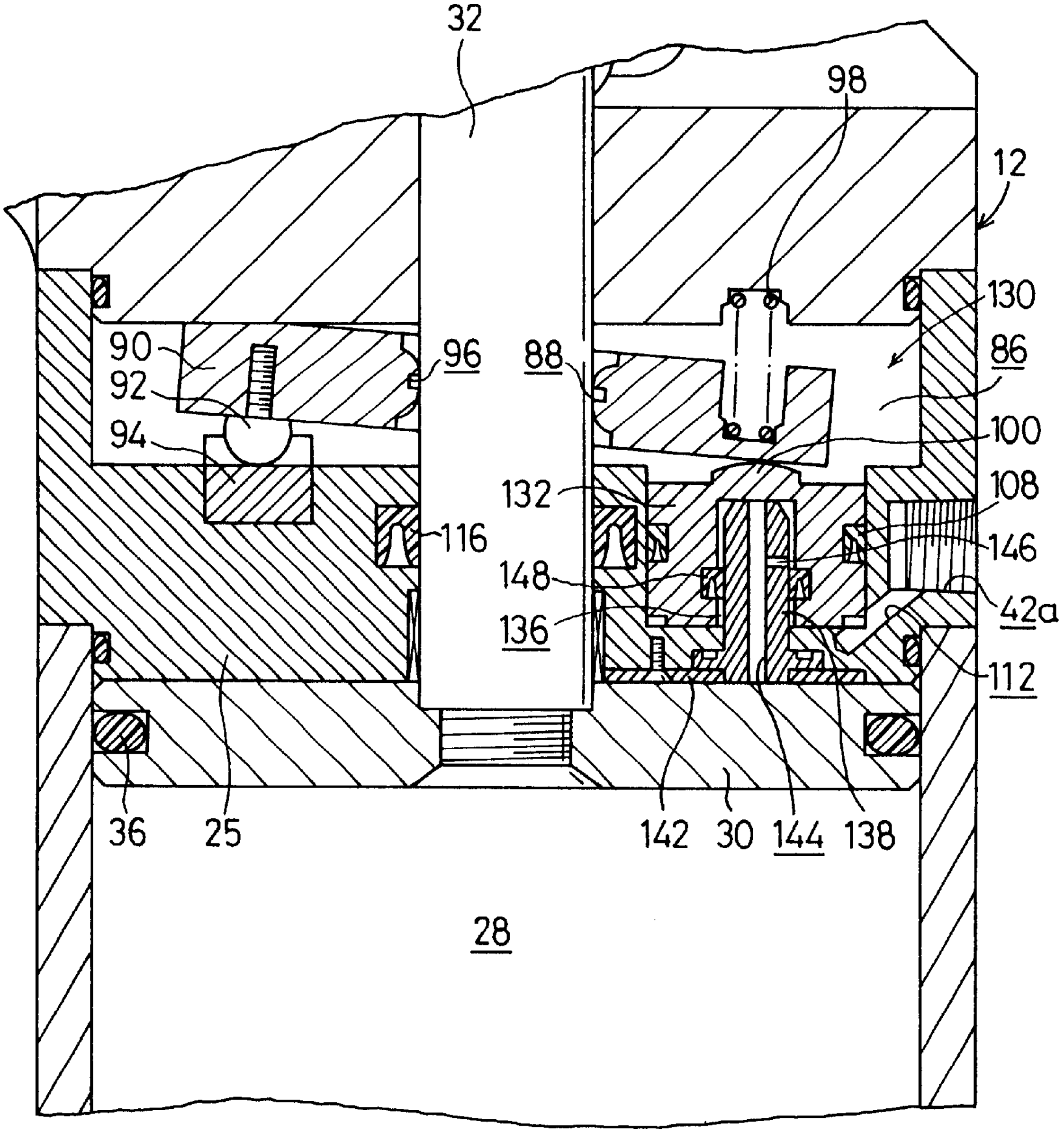
FIG. 7 shows, with partial omission, a magnified vertical sectional view illustrating a modified embodiment of the lock mechanism.
Figure 8:
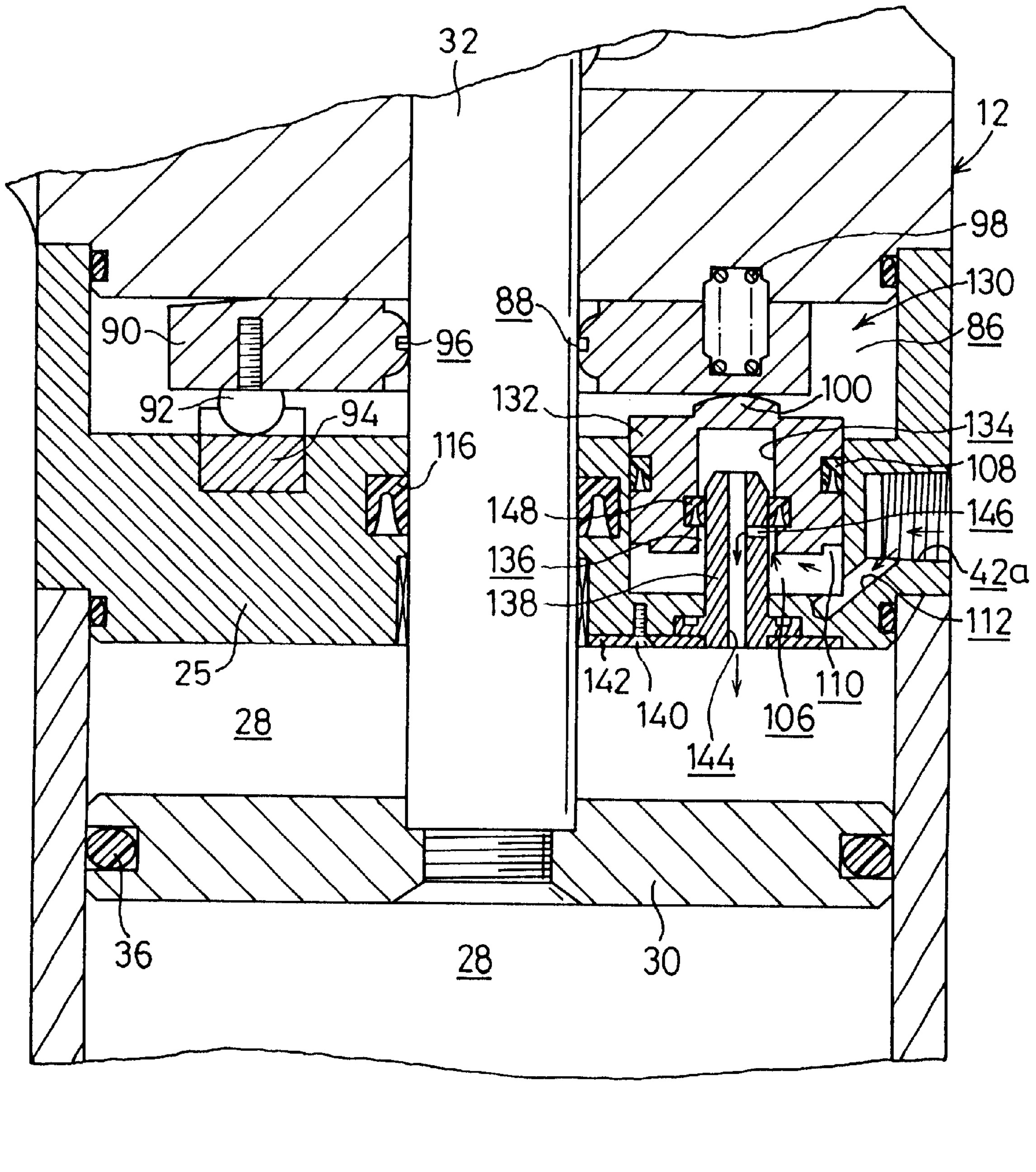
FIG. 8 shows, with partial omission, a magnified vertical sectional view illustrating a state in which the locked state shown
Figure 9:
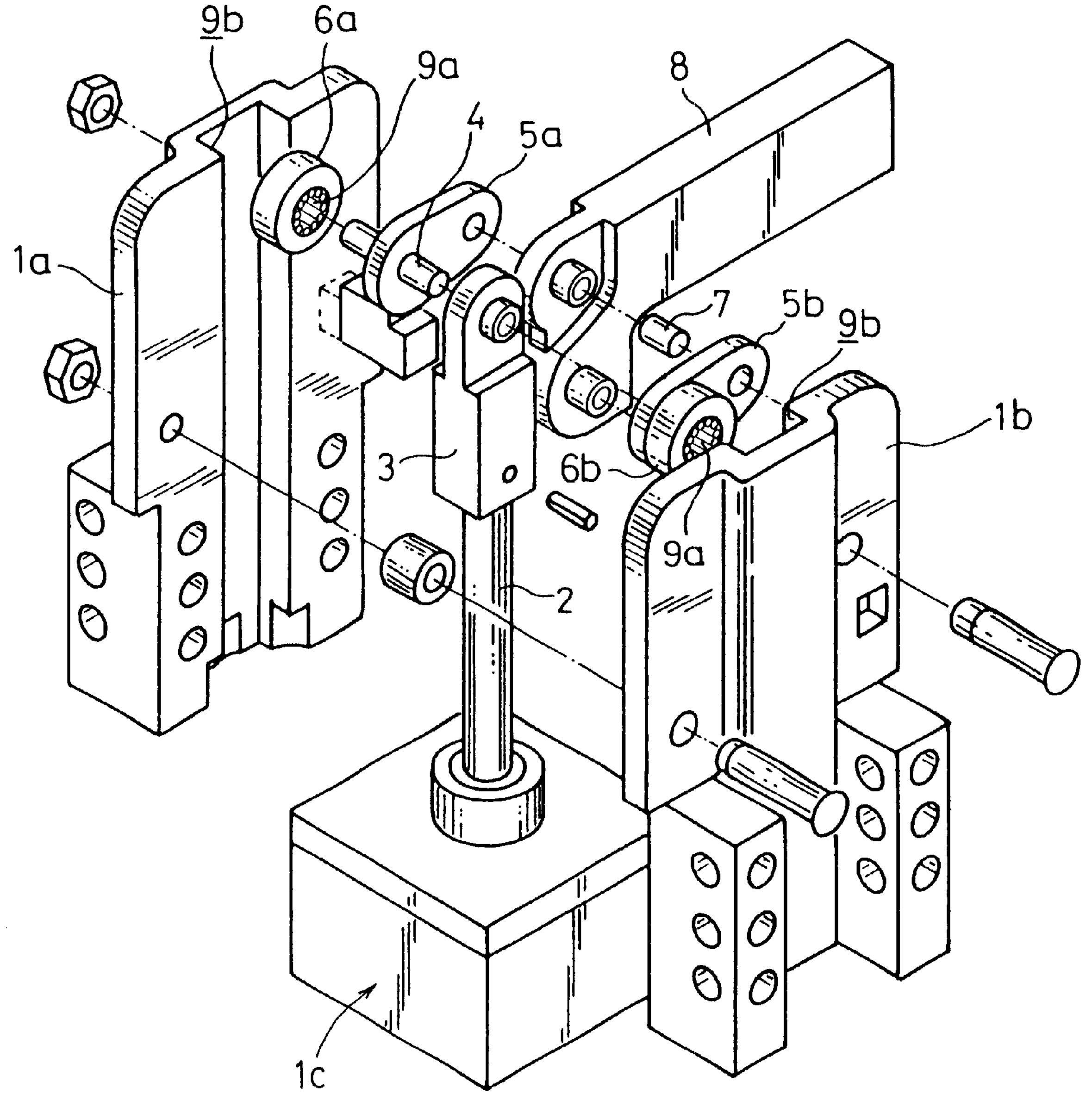
FIG. 9 shows an exploded perspective view illustrating principal parts of a clamp cylinder concerning the conventional technique.
Figure 10:
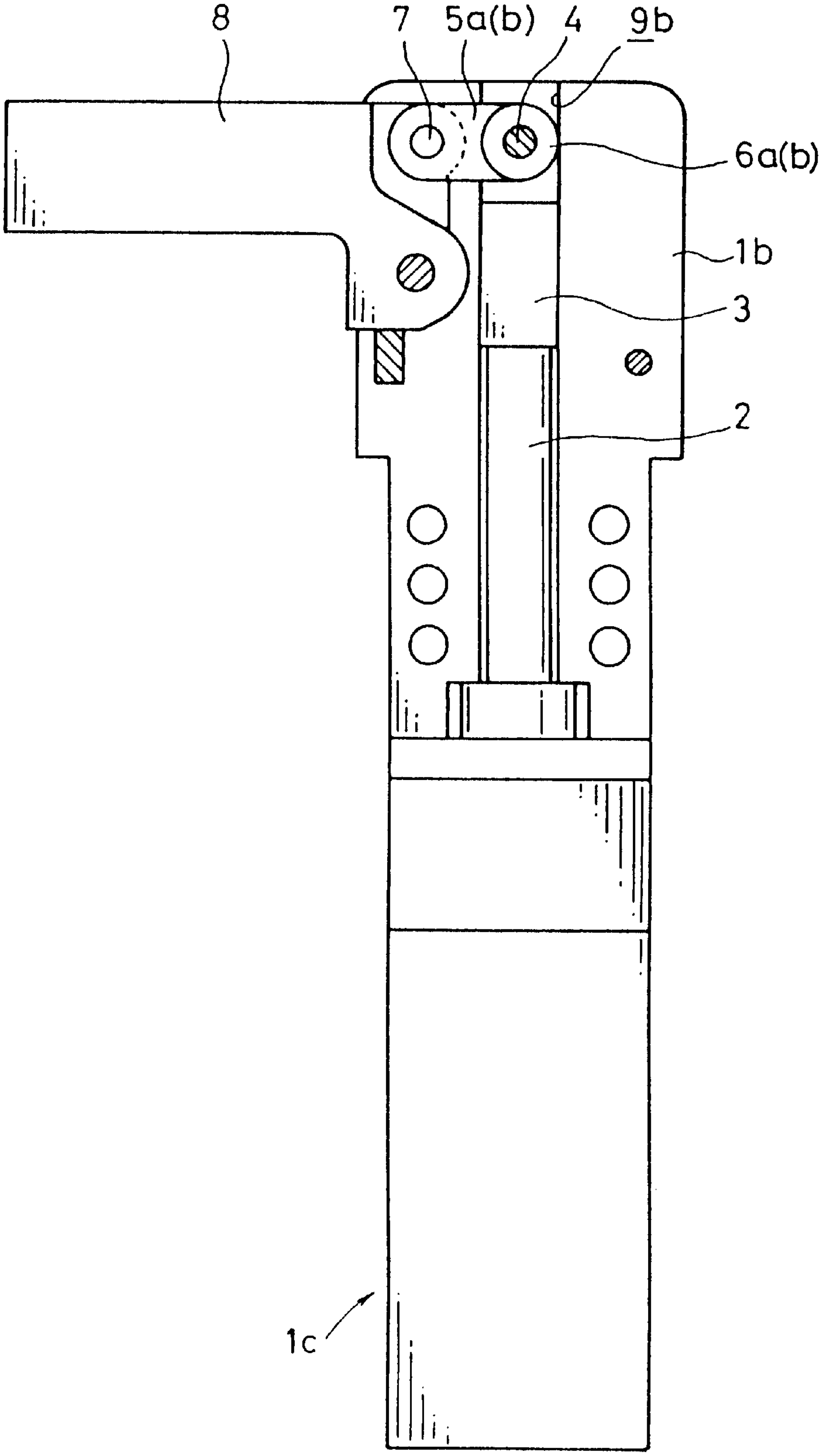
FIG. 10 shows, with partial cross section, a side view illustrating the clamp cylinder shown in FIG. 9.

Next, a modified embodiment of the lock mechanism is shown in FIGS. 7 and 8. The same constitutive components as the constitutive components shown in FIG. 2 are designated by the same reference numerals, detailed explanation of which will be omitted.

FIG. 7 shows a locked state, and FIG. 8 shows a state in which the locked state is canceled.

In a lock mechanism 130 according to the modified embodiment, a bottom-equipped cylindrical hole 134 is formed at a substantially central portion of a release piston 132, and a projection member 138 having a predetermined clearance 136 is inserted into the hole 134. The projection member 138 is provided to protrude toward the pressure chamber 106 by a predetermined length in a hole of the block member 25, and it is held by a plate 142 which is tightened to the block member 25 by the aid of a screw member 140. The projection member 138 is formed with a through-hole 144 which penetrates therethrough in the axial direction. A passage 146, which communicates with the pressure chamber 106, is provided for the through-hole 144.

A seal member 148, which surrounds the outer circumferential surface of the projection member 138, is installed to the hole 134 of the release piston 132. Before the release piston 132 is moved upwardly to pass over the passage 146, the passage 146 is closed in accordance with the sealing action of the seal member 148. The supply of the pressure fluid to the upper cylinder chamber 28 is prohibited.

On the other hand, after the release piston 132 is further moved upwardly to pass over the passage 146, the passage 146 is opened to make communication between the pressure chamber 106 and the upper cylinder chamber 28. Accordingly, the pressure fluid is introduced into the upper cylinder chamber 28.

The pressure fluid is supplied to the passage 146 via the clearance 136 between the hole 134 of the release piston 132 and the projection member 138.

In the lock mechanism 130 according to the modified embodiment, the passage 146 is closed by the seal member 148 during the period until the lock plate 90 is displaced in accordance with the upward movement action of the release piston 132 to cancel the locked state. Therefore, the pressure fluid supplied to the pressure chamber 106 is reliably prevented from the introduction into the upper cylinder chamber 28. Therefore, the pressure fluid is not introduced into the upper cylinder chamber 28 before the locked state is canceled. The lock mechanism 130 is provided such that the rod member 32 is moved downwardly after the locked state is reliably canceled.

In other words, the piston 30 is prevented from the operation before the release piston 132 is operated to cancel the locked state. Therefore, the downward movement of the rod member 32 is prohibited before the locked state is canceled, and thus the locked state can be reliably canceled, because of the following reason. That is, if the rod member 32 is moved downwardly before the locked state is canceled, then the nipping state of the lock plate 90 for the rod member 32 is enhanced, and it is difficult to cancel the locked state.

The other functions and effects are the same as those of the lock mechanism 22 shown in FIG. 2, detailed explanation of which is omitted.

In the embodiment of the present invention, the cylinder is used as the driving mechanism. However, there is no limitation thereto. It is also preferable that the rod member 32 is displaced by using, for example, an unillustrated linear actuator or an unillustrated electric motor.

What is claimed is:

1. A clamp apparatus comprising:

a body;

a driving mechanism for displacing a rod member provided at the inside of said body in an axial direction of said body, wherein said driving mechanism is composed of a cylinder section including a piston which is displaceable in accordance with an action of a pressure fluid supplied to a cylinder chamber via a pair of pressure fluid inlet/outlet ports;

a toggle link mechanism including a link member connected to said rod member, for converting rectilinear motion of said rod member into rotary motion;

an arm connected to said toggle link mechanism, for making rotation by a predetermined angle in accordance with a driving action of said driving mechanism; and a lock mechanism provided at the inside of said body, for maintaining a clamped state of a workpiece effected by said arm regardless of presence or absence of transmission of driving force of said driving mechanism to said arm, wherein one of said pair of fluid inlet/outlet ports communicates with said lock mechanism for actuating said lock mechanism by said pressure fluid when said pressure fluid is supplied through said one of said pair of fluid inlet/outlet ports.

2. The clamp apparatus according to claim 1, wherein said lock mechanism includes a lock plate which is formed with a hole for making engagement with said rod member and which is tiltable about a support point of a support point pin, and a release piston for pressing said lock plate against resilient force of a spring member.

3. The clamp apparatus according to claim 2, further comprising a pressure chamber to which a pressure fluid for pressing said release piston is supplied, and a passage for making communication between said pressure chamber and a cylinder chamber after said release piston is displaced to cancel a locked state.

4. The clamp apparatus according to claim 2, further comprising a projection member for being inserted into a hole of said release piston, wherein said projection member is formed with a through-hole for making communication with a cylinder chamber, and a passage for making communication between said through-hole and a pressure chamber.

5. The clamp apparatus according to claim 4, wherein said release piston is provided with a seal member for closing said passage in a locked state and opening said passage when an unlocked state is given.

6. The clamp apparatus according to claim 2, wherein an inner circumferential surface of a hole of said lock plate is formed to have a circular arc-shaped cross section.

7. The clamp apparatus according to claim 6, wherein an annular groove is formed at said inner circumferential surface of said hole of said lock plate.

8. The clamp apparatus according to claim 2, wherein said lock mechanism is provided with a pressure chamber which is closable by said release piston and which makes communication with a first pressure fluid inlet/outlet port for supplying a pressure fluid thereto.

9. The clamp apparatus according to claim 2, wherein said lock mechanism is provided with an external operation member which is connected to said lock plate and which is exposed to the outside through a hole.

* * * * *